Dec. 13, 1966   R. O. GORDON   3,291,053
THRUST BEARING FOR PUMP OR MOTOR
Filed Jan. 14, 1965   3 Sheets-Sheet 1

INVENTOR
RICHARD O. GORDON
BY *J. C. Wiesler*
ATTORNEY

Dec. 13, 1966 R. O. GORDON 3,291,053
THRUST BEARING FOR PUMP OR MOTOR
Filed Jan. 14, 1965 3 Sheets-Sheet 2

INVENTOR
RICHARD O. GORDON
BY
ATTORNEY

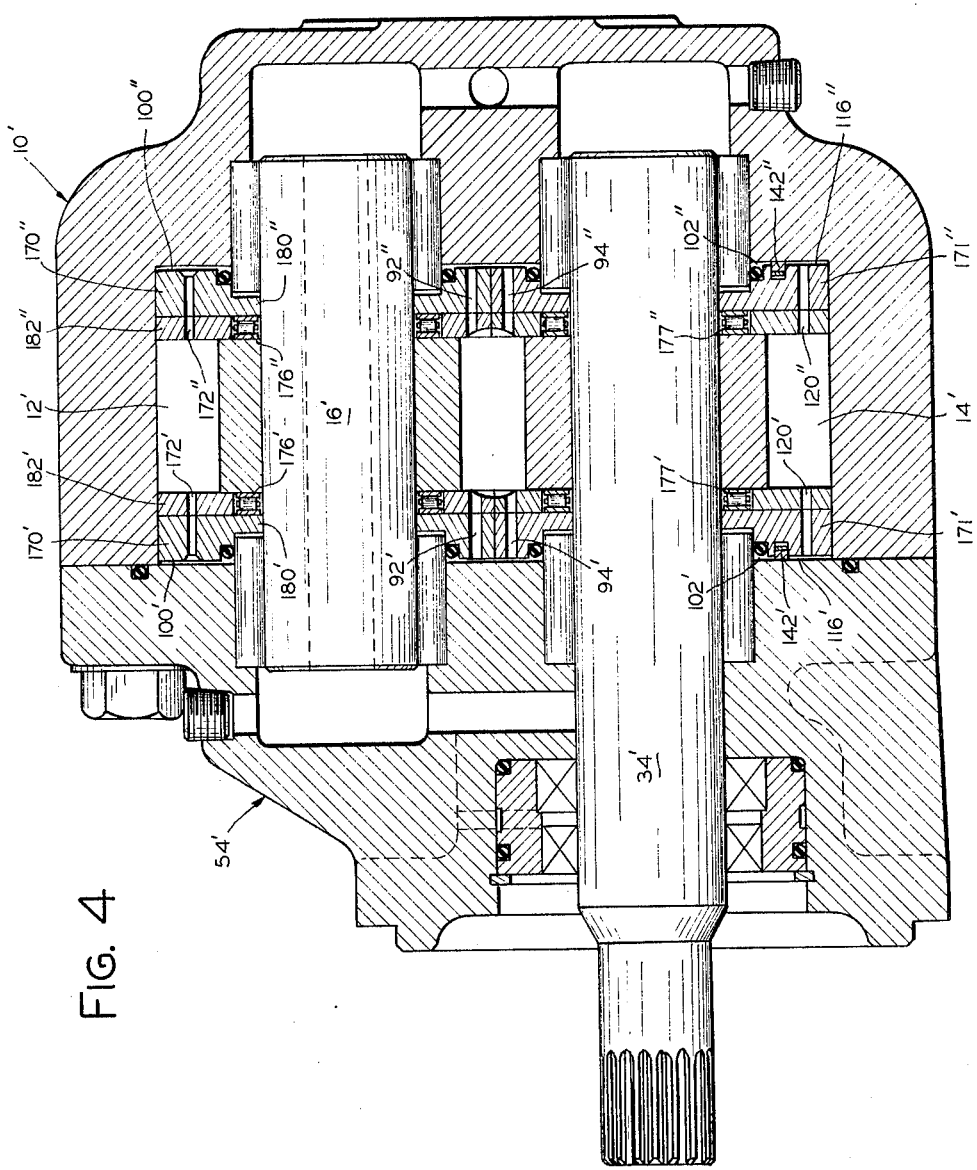

United States Patent Office 3,291,053
Patented Dec. 13, 1966

3,291,053
THRUST BEARING FOR PUMP OR MOTOR
Richard O. Gordon, Mequon, Wis., assignor to Clark Equipment Company, a corporation of Michigan
Filed Jan. 14, 1965, Ser. No. 425,495
6 Claims. (Cl. 103—126)

This invention relates to a thrust bearing for fluid displacement pumps and motors, and more particularly to thrust bearing construction for pressure-loaded gear pumps and motors.

In some applications of gear pumps and motors end thrust in a direction axial of the drive shaft is encountered, and it is a primary object of the present invention to provide an improved thrust bearing construction for such pumps and motors.

Another object of the present invention is to provide in gear pumps and motors a roller thrust bearing construction associated with the drive and driven shafts and located intermediate side surface portions of the gears and opposed side surface portions of pressure responsive thrust plates.

In carrying out my invention I provide in a pressure-loaded type gear pump or motor intermediate side surface portions of the gears and adjacent side surface portions of thrust plates, roller bearing means mounted on the driving and driven shafts in cavities provided between the said gear side faces and adjacent thrust plate surfaces and radially inwardly of the root diameter of each gear for taking end thrust which may be imposed upon either the driving or driven shaft.

Other objects and features of the present invention will become apparent from the following detailed description taking in conjunction with the drawings wherein:

FIGURE 4 is a longitudinal sectional view of a pressure-loaded type intermeshing gear pump or motor similar to FIG. 1 as modified by FIG. 3, and modified further to show a dual pressure loading construction.

Figure 1:
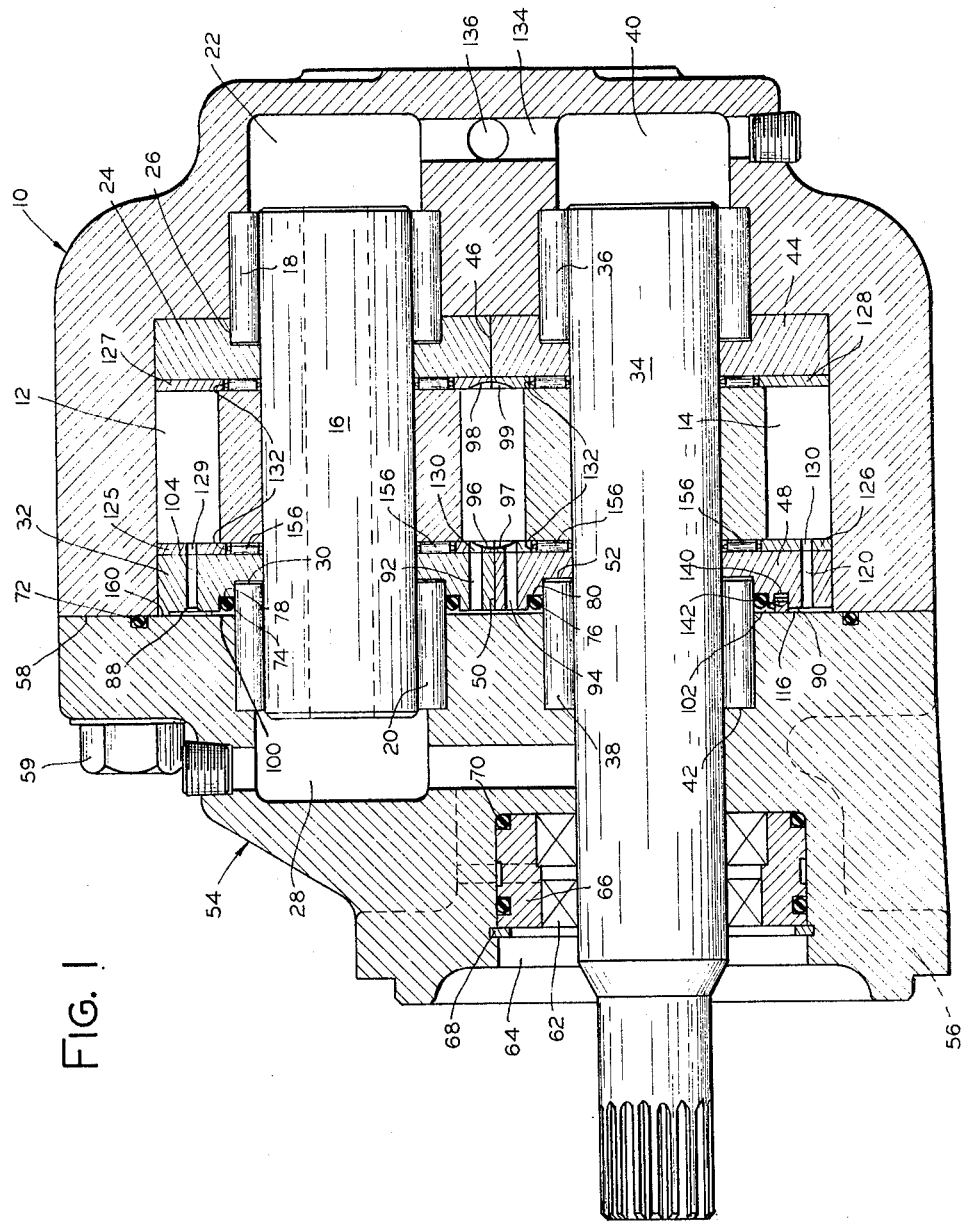
FIGURE 1 is a longitudinal sectional view of a pressure-loaded type intermeshing gear pump or motor taken along line 1—1 of FIG. 2.
Figure 2:
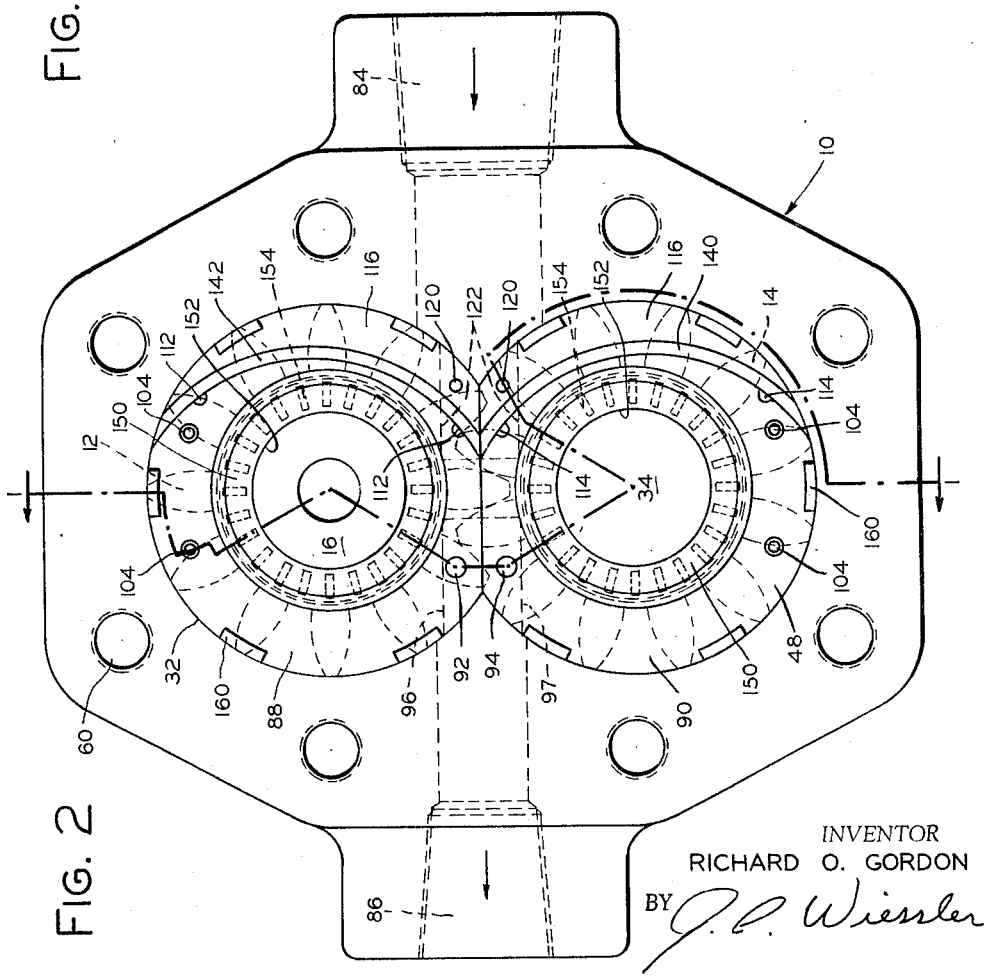
FIGURE 2 is an end elevational view of the pump taken from the left end of FIG. 1 with the cover body removed.

Referring now to FIGS. 1 and 2, numeral 10 denotes a suitably chambered gear pump housing in which are rotatably mounted a driven gear 12 and intermeshing driving gear 14. Driven gear 12 is supported on a shaft 16 journaled on its right side in a roller bearing 18 and on its left side in a roller bearing 20. Roller bearing 18 is located in chamber 22 and is maintained in position by a fixed thrust plate 24 located intermediate bearing 18 and gear 12 and providing an annular recess 26 in registry with a left end portion of the bearing. The bearing member 20 is located in housing chamber 28 and is located in registry with an annular recess portion 30 of a fluid pressure responsive thrust plate 32 intermediate said bearing and the one side face of gear 12. Driving gear 14 is mounted for rotation upon a drive shaft 34 journaled on its right side in roller bearing 36 and intermediate its end in a roller bearing 38, said roller bearings being mounted in chambers 40 and 42, respectively, in a manner similar to the mounting of bearings 18 and 20. A fixed thrust plate 44 is mounted intermediate gear 14 and bearing 36 in a manner similar to the mounting of thrust plate 24, said plates 24 and 44 mating in sealing relationship along complementary flat surfaces thereof indicated at numeral 46. A pressure responsive thrust plate 48 is mounted intermediate gear 14 and bearing 38 in a manner similar to the mounting of thrust plate 32, said thrust plate 32 and 48 abutting in sealing relationship along complementary flat surfaces thereof indicated at numeral 50. A recess 52 is formed in thrust plate 48 and receives one end portion of bearing 38. The construction of thrust plates 32 and 48 will be described in greater detail hereinafter in conjunction with the thrust bearings of this invention which are mounted on shafts 16 and 34 at opposite sides of each of the gears 12 and 14.

A cover body 54 having an adaptor connecting flange 56 and a mating surface 58 is secured to the pump body by means of a plurality of bolts 59 adapted to be received in threaded openings 60 in pump body 10. Shaft sealing means 62 is located in an enlarged chamber 64 of cover body 54 between a seal retainer member 66, the shaft 34, and a portion of the cover body 54. A snap ring 68 locates seal retainer 66 in chamber 64. A plurality of O-rings are mounted in annular grooves formed in various parts of the pump construction to provide sealing means. The O-ring 70 provides a seal between the retainer member 66 and cover body 54; O-ring 72 provides a seal between the pump body 10 and the cover body 54; O-rings 74 and 76 are located in recesses 78 and 80 of thrust plates 32 and 48, respectively, and provide seals between the thrust plates and bearing members 20 and 38, respectively.

The pump body 10 has an inlet conduit 84 formed in the right side and outlet conduit 86 formed in the left side thereof. Pressure generated by the gears is communicated from the discharge side of the pump to rear or motive surfaces 88 and 90 of the thrust plates 32 and 48, respectively, through relatively large openings 92 and 94 in said thrust plates. The passages 92 and 94 open into discharge trapping recesses 96 and 97 on the discharge side of the pump, said recesses being formed in the forward side surfaces of the thrust plates 32 and 48. Similar trapping recesses 98 and 99 are formed in the forward side surfaces of fixed thrust plates 24 and 44. These recesses insure continuous communication of openings 92 and 94 with full discharge pressure. The discharge pressure fluid is directed through passage 92 into a pressure chamber 100 which is formed between surface 58 of cover body 54 and the rear surface 88 of thrust plate 32, and is directed through passage 94 into chamber 102 which is formed between the cover body and rear surface 90 of the thrust plate 48. One or more pressure gradient openings 104, a pair as shown, are located in each of thrust plates 32 and 48 in circumferentially spaced relation to each other and to discharge openings 92 and 94. The pressure gradient openings 104 are located radially outwardly of the root diameter of the gear teeth in gears 12 and 14 so that said openings are adapted to communicate continuously in a manner to be described with pressure fluid generated in the gear teeth pockets in the area of each opening 104.

A plurality of annular thrust washers 125, 126, 127 and 128 are mounted between the forward surfaces of thrust plates 32, 48, 24 and 44 and the side faces of the gears 12 and 14. Thrust washers 125 and 126 have a plurality of openings 129, 130 and 131 therein which are adapted to register with the respective openings 104, 120, 92 and 94, as best shown in FIG. 1. Each of the thrust washers has a gear face sealing portion concentric with the respective shafts 16 and 34 and having an inner diameter somewhat smaller than the root diameter of the adjacent gear so as to provide, as shown, an overlapping annular portion 132 which extends a short distance radially inwardly of the root diameter of the gear for sealing the side face of the gear against leakage from the gear pockets radially inwardly along the side face of the gear. Any pressure fluid which may leak between the gear side faces and the thrust washer sealing surfaces flows along shafts 16 and 34 through the various bearing members and is collected in chambers 22, 28 and 40 and thence vented back to pump inlet passageways 134 and 136.

Arcuate and complementary grooves 140 are formed in the motive surfaces of thrust plates 32 and 48 on the inlet sides thereof and are adapted to receive sealing rings 142 for providing a seal with the facing surface of cover body 54. Grooves 140 communicate with the pressure chambers 100 and 102 by way of pairs of openings 112 and 114 formed in the radially inner walls of the grooves so that in operation pressure fluid in chambers 100 and 102 is communicated to the groove chambers beneath arcuate members 142 in sealing or semi-sealing relation with the cover body and housing bores. Located radially outwardly of grooves 140 in chambers 116, which chambers are formed between sealing members 142, thrust surfaces 88 and 90 and the opposed cover body surface 58, is a pair of drain openings 120 which extend through thrust plates 32 and 48 in order to communicate chambers 116 with pump inlet pressure in a pair of inlet trapping recesses 122 formed in the thrust plate on the inlet side of the pump.

The over-all pump structure described above is described in greater detail both with respect to structure and operation in my U.S. Patent 3,137,238 and need not be described in further detail herein since reference may be made to said prior patent. However, it should be understood that I do not intend that the present invention be limited in any sense to any particular design of gear pump, such as that described above which is merely exemplary of one of many gear pump structures with which the present invention may be used. It should also be understood that the present invention is applicable also to gear motors, and whenever the term "pump" is used herein it is intended also to include motors.

The improvement in gear pumps effected by the above-described embodiment of the present invention concerns the provision of thrust washers 125, 126, 127 and 128 mounted intermediate the respective gears and thrust plates. The thrust washers are each provided with an annular web portion 150 having an opening 152 co-axial with one of shafts 16 or 34 and mounted on one of said shafts. A plurality of radially outwardly extending openings 154 are provided in each of annular web portions 150 of the various thrust washers, and are adapted to have mounted therein a corresponding plurality of roller bearing members 156 which together with the respective thrust washers form a thrust roller bearing assembly insertable in the pump as shown during assembly thereof. A plurality of projections 160 are provided in circumferentially spaced relation at the outer periphery of each thrust plate 32 and 48 so that when the pump is assembled the outer surfaces of projections 160 mate with surface 58 of cover plate 54 so as to effect a light touching engagement between the side surfaces of the gears and the respective thrust washers and peripheries of rollers 156. The peripheries of the roller 156 and opposite sides of the thrust washers will also, of course, then be in contact with the respective opposed surfaces of the thrust plates 24, 32, 44 and 48. If desired, removable adjustment shims can be substituted for thrust plate projections 160 for the purpose of providing for little or no axial movement of the parts between surface 58 and the corresponding surface in housing 10 for the above-stated purpose.

In operation, as will be appreciated by persons skilled in the art, the motive pressure chambers 100 and 102 are subjected to a variable pressure determined by the relative areas of discharge pressure vented openings 92, 94 and pressure gradient openings 104, 129 and by the characteristic of the pressure gradient which acts on the sealing side of each thrust washer. The force which tends to push each thrust washer and thrust plate away from the gear side face is equal to the pressure or pressures of fluid between the teeth from the inlet around to the outlet times the area of the sealing surface of each thrust washer which is subjected to this pressure or pressures. Under any pressure gradient condition a smooth flow of pressure fluid is effected from discharge vented openings 92 and 94 across the respective thrust plate chambers 100 and 102, through the various gradient openings 104, 129 and to the respective gear pockets in which somewhat lower fluid pressures are present than that existing in chambers 100 and 102. If the pump is run under conditions which results in little or no pressure gradient on the high pressure side of sealing member 142, such as during pumping of solid oil at a low r.p.m., a substantially uniform distribution of fluid at or near discharge pressure will exist throughout said area on the sealing side of the thrust washers 125 and 126 and the chamber side of the thrust plates 32 and 48. Streamlines of dynamic pressure fluid flow from the discharge recesses 96 and 97 through openings 92 and 94 in pressure chambers 100 and 102 to each gradient opening 104, 129, and a different pressure drop will occur across each gradient opening depending upon the pressure condition in the area of said opening on the sealing side of the thrust plates. Localized pressure areas around each gradient opening on the motive surface sides 88 and 90 thereof will therefore approach the pressure in the area surrounding the opposite side of each gradient opening, whereby a pressure gradient proportional to and somewhat greater than the gradient on the sealing side of each thrust washer is established in chambers 100 and 102 and the thrust plates and thrust washers remain in substantial balance irrespective of changes for any reason in the pressure gradient on the sealing sides thereof.

In addition to the pressure gradient flow system described above, sealing members 142 operate in grooves 140 in combination with pressure fluid venting to said grooves through openings 112 and 114, to provide a substantial sealing off of the pressure fluid in chambers 100 and 102 from the fluid in chambers 116 on the low pressure side of said sealing members. The amount of pressure flow which enters chambers 116 from chambers 100 and 102 during any given discharge pressure condition will determine the level of pressure in chambers 116 depending upon the inlet pressure condition in recesses 122 and the area of openings 120. Since the pressure in recesses 122 and throughout the areas of the sealing side of the thrust washers which correspond to the configuration of chambers 116 tends to remain at a substantially constant zero gauge pressure, it will be understood that use of a higher than zero pressure in chambers 116 effects a sealing of those portions of the thrust washers under chambers 116 which are in contact with the gear side faces. The serious unbalance which would otherwise occur on the inlet side of the thrust plates is therefore alleviated by sealing off discharge pressure fluid from chambers 116 with sealing members 142 and the use of drain openings 120.

Any axially directed thrust encountered during operation of the pump is resisted by the thrust washer and roller bearing assemblies 125, 126, 127 and 128, irrespective of the pressure gradient or other conditions in which the pump is operating. No provision, other than the mounting of an external bearing on the driving shaft, has commonly been made heretofore in gear pump and motor designs for resisting axial or end thrust during operation, and the improvement comprising my invention provides such a structure in pressure-loaded type gear pumps and motors for both external and internal thrust loads.

Preferably, when the pump as shown in FIGS. 1 and 2 is assembled there should be substantially zero clearance in the stack-up assembly of the thrust plates, thrust washer and bearing assemblies, and gears, so that there can be no excess movement in an axial direction when there exists end thrust forces axial of the drive or driven shafts.

Figure 3:
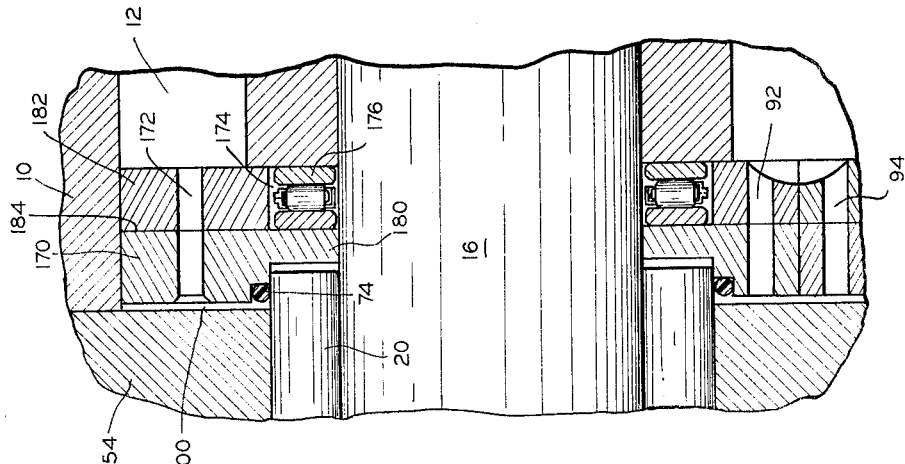
FIGURE 3 is an enlarged broken-away sectional view of a portion of the pump or motor showing a modified form of the thrust bearing construction shown in FIGS. 1 and 2.

Referring now to the modified form of the invention shown in FIG. 3, I have illustrated in enlarged, broken-away sectional view one of the thrust plate and end thrust bearing assemblies in a pump or motor, wherein similar parts are numbered the same as in FIGS. 1 and 2. In this modification, the pressure-loaded thrust plate 170 having a configuration as shown and pressure gradient openings 172 is adapted to engage in sealing relation on the one side surface thereof the corresponding side face of gear 12 and to engage on the opposite side at circumferentially spaced projections 160 thereof the surface 58 of cover body 54. Radially inwardly of the thrust plate and adjacent gear 12 is formed an annular groove 174 adapted to receive a thrust roller bearing 176 which is mounted on shaft 16 in groove 174 such that when assembled there is substantially zero clearance in the stack-up of pressure plates, gears and thrust bearings between the opposed surfaces of cover body 54 and pump housing 10. Thus, it will be noted that the opposite sides of the cage and race of each roller bearing 176 are in light touching engagement with the side face of gear 12 on the one side and with the radially inwardly projecting annular portion 180 of the thrust plate on the other side. Similar touching engagement preferably exists between the sealing side of thrust plate 170 and the side face of the gear when the pump is assembled, as shown. It will be understood that four thrust roller bearings and four thrust plates are present in the complete pump structure, the same as in FIGS. 1 and 2, modified in accordance with the teaching embodied in FIG. 3. Functionally, in operation, axial end thrust is resisted by the thrust roller bearing in a manner similar to the operation of the construction shown in FIGS. 1 and 2.

Since some difficulty may be encountered in manufacturing thrust plates 170 and bearings 176 so that the sides of each such bearing are in light touching engagement with both the side face of the gear and the adjacent face of annular portion 180 of the thrust plate, I prefer to use a thrust plate 170 in which the portion 182 which engages the gear is a bronze or tinned aluminum material which is bonded to the rear portion of the plate at 184, said rear portion being composed, for example, of flexible spring steel and wherein the projecting annular portion 180 is of relatively thin cross-section so that when chamber 100 is pressurized manufacturing tolerances may be compensated for by flexure of the rear portion of the plate, and particularly of annular portion 180, as forward portion 182 engages the side face of the gear in sealing relation. In other words, if the width of bearing 176 is somewhat smaller than the width of groove 174, portion 180 of the thrust plate will, during operation, flex toward the bearing to maintain engagement between the sides of the bearing, the gear and the thrust plate portion 180, whereas if the groove 174 is somewhat narrower than the width of bearing 176, portion 180 will flex outwardly to accommodate the bearing.

Referring now to FIG. 4, I disclose a preferred embodiment of the present invention which shows a longitudinal section of the pump construction similar to that illustrated in FIGS. 1 and 2, modified by the thrust plate structure shown in FIG. 3, and further modified in that pressure-loaded thrust plates are provided on both sides of each of the gears. In FIG. 4 the parts which are similar to those shown in FIGS. 1 and 3 are denoted by prime numbers the same as the numbers in FIGS. 1 and 3. A description of the over-all pump structure shown in FIG. 4 is therefore not required since it would duplicate in large part the above description of FIGS. 1 and 3. In FIG. 4 pressure responsive thrust plates 170″ and 171″ are shown in place of fixed thrust plates 24 and 44 of FIG. 1, and are of the same construction as thrust plates 170′ and 171′, but bear an allochiral relationship to the latter thrust plates such that plates 170″ and 171″ respond to pressure gradient compensated pressure in chambers 100″ and 102″ the same as plates 170′ and 171′ respond to such pressure in chambers 100′ and 102′. Thus, it will be noted that each of the thrust plates 170″ and 171″ on the right-hand side of the pump respond in the same manner as thrust plates 170′ and 171′ on the left-hand side of the pump, as viewed in FIG. 4, which latter thrust plates are of the same construction as plate 170 of FIG. 3. Inasmuch as the pressure loading is applied to gears 12′ and 14′ by fluid pressure responsive thrust plates at both sides of the gears, it is not necessary to provide projections 160 spaced peripherally of the thrust plates to provide substantially zero clearance in the stack-up of parts between the inner walls of the pump body and of cover plate 54, as in the preceding embodiments, or to provide shims for a similar purpose. This will be apparent inasmuch as a pressure seal is assured at all times during operation at both sides of the gears whereby, regardless of the direction in which axial thrust is applied to the drive shaft, the thrust plates, gears and bearings will automatically adjust for zero clearance therebetween. In the event, for example, of thrust axially inwardly of shaft 34′, thrust is transmitted to gear 14′ and thence to the main body of the pump by way of thrust plates 171′ and 171″ and roller bearings 176″ and 177″, thus providing substantially zero clearance between said thrust plates and the adjacent housing wall of chambers 100″ and 102″ while thrust plates 170′ and 171′ are actuated by pressure in chambers 100′ and 102′ to maintain sealing engagement at all times with the adjacent side faces of the gears. Driven gear 12′ follows the movements of drive gear 14′ in the aforementioned example by reason of the action of the intermeshing gear teeth of gear 14′ pushing on thrust plate 170″.

It should be noted that the pump construction shown in FIGS. 3 and 4 may be satisfactorily operated, if desired, without the use of the thrust roller bearings if the pump will not encounter substantial axial thrust during operation, thus providing a versatile pump structure capable of utilizing internal axial thrust bearings or not, as desired, without modifying the pump structure.

Although I have described and illustrated only a few embodiments of my invention, it will be understood by those skilled in the art that modifications may be made in the structure, form and relative arrangement of parts without departing from the spirit and scope of the invention. Accordingly, it should be understood that I intend to cover by the appended claims all such modifications which fall within the scope of my invention.

I claim:

1. In a pump or motor of the type including a housing containing intermeshing gears and having an inlet leading to and an outlet leading from said housing, driving and driven shaft means mounting said gears in the housing, pressure responsive thrust means mounted on each of said shaft means on opposite sides of each of said gears for sealing the side faces of the respective gears from leakage of pressure fluid radially inwardly of said gears, and an annular end thrust bearing means mounted on each of said shaft means in contact with each side face of each of said gears and with a portion of the adjacent thrust means, said thrust bearing means comprising a roller bearing assembly having a plurality of radially extending rollers located circumferentially outwardly of the respective shaft means and circumferentially inwardly of that portion of the thrust means which is adapted to engage in sealing relation the side face of the gear.

2. A pump or motor of the type claimed in claim 1 wherein certain of said thrust means includes a pressure responsive thrust plate and a thrust washer assembly located axially intermediate the thrust plate and the adjacent side face of a gear.

3. A pump or motor as claimed in claim 1 wherein certain of said thrust means includes a thrust plate having a sealing surface for sealing the side face of one of said gears, the side of said thrust plate remote from said sealing surface forming a portion of a motive pressure chamber in the housing, and an axially extending annular groove in the thrust plate which extends radially outwardly from the periphery of the shaft means on which the thrust plate is mounted to a position radially inwardly of the root diameter of the gears for receiving said thrust bearing means.

4. A pump or motor as claimed in claim 1 wherein each of said thrust means and the respective gears and thrust bearing means are assembled in the housing on the respective shaft means so as to provide substantially zero total axial clearance between the said shaft mounted elements such that the respective bearing means resist axial or end thrust which may be imposed on the driving or driven shaft means.

5. In a pump or motor of the type including a housing containing intermeshing gears and having an inlet leading to and an outlet leading from said housing, driving and driven shaft means mounting said gears in the housing, axially extending bearing means mounted in the housing, said shaft means being journaled in said bearing means for rotation, said bearing means being adapted to resist sidewise thrust which may be imposed on said shaft means, thrust means mounted on each of said shaft means on opposite sides of each of said gears for sealing the side faces of the respective gears from leakage of pressure fluid radially inwardly of said gears, the thrust means on one side of said gears forming with a portion of the housing a motive pressure chamber in the housing for receiving pressure fluid imposing on said thrust means a force for sealing the opposed side faces of the respective gears, and an annular end thrust bearing means mounted on each of said shaft means in contact with each side face of each of said gears and with at least a portion of the adjacent thrust means for resisting axial or end thrust which may be imposed on the driving or driven shaft means, said end thrust bearing means being mounted on the respective shaft means in a plane transverse of the said shaft means and comprising a roller bearing assembly having a plurality of radially extending rollers located circumferentially outwardly of the respective shaft means and circumferentially inwardly of that portion of the thrust means which is adapted to engage in sealing relation the side face of the gear.

6. A pump or motor of the type claimed in claim 5 wherein each of said thrust means and the respective gears and end thrust bearing means are assembled in the housing on the respective shaft means so as to provide substantially zero total axial clearance between the said latter shaft mounted elements.

References Cited by the Examiner

UNITED STATES PATENTS

| 885,783 | 4/1908 | Palmer | 230—145 |
| 2,864,315 | 12/1958 | Udale | 103—126 |
| 2,969,744 | 1/1961 | Hoffer | 103—126 |
| 2,981,200 | 4/1961 | Stephens | 103—126 |
| 3,057,302 | 10/1962 | Lockett | 103—126 |
| 3,077,840 | 2/1963 | Wood | 103—126 |
| 3,137,238 | 6/1964 | Gordon | 103—126 |
| 3,203,355 | 8/1965 | Purcell | 103—126 |

MARK NEWMAN, *Primary Examiner.*

WILBUR J. GOODLIN, *Examiner.*